United States Patent
Bank et al.

(10) Patent No.: US 9,948,494 B2
(45) Date of Patent: Apr. 17, 2018

(54) METHOD TO SAVE DATA USAGE IN MOBILE DEVICES BASED ON PRIOR HISTORY

(71) Applicant: International Business Machines Corporation, Armonk, NY (US)

(72) Inventors: Judith H. Bank, Cary, NC (US); Lisa M. Bradley, Cary, NC (US); Aaron J. Quirk, Cary, NC (US); Lin Sun, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/868,846

(22) Filed: Sep. 29, 2015

(65) Prior Publication Data

US 2017/0093671 A1    Mar. 30, 2017

(51) Int. Cl.
*H04L 29/08* (2006.01)
*H04W 76/02* (2009.01)

(52) U.S. Cl.
CPC .. *H04L 29/08108* (2013.01); *H04L 29/08072* (2013.01); *H04L 29/08135* (2013.01); *H04L 29/08675* (2013.01); *H04W 76/023* (2013.01)

(58) Field of Classification Search
CPC ........... H04L 43/0876; H04L 29/08108; H04L 29/08117; H04L 29/08576; H04L 29/08675; H04L 29/08954; H04L 29/08981; H04L 43/026; H04L 47/25; H04L 47/801; H04L 47/803; H04L 47/805; H04L 47/808; H04L 43/04; H04L 45/22; H04L 67/02; H04L 63/0492; H04L 67/18; H04L 67/306; H04L 67/42; H04L 1/008; H04L 29/06027; H04L 29/06088; H04L 41/0213; H04L 41/5038; H04W 76/023;

(Continued)

(56) References Cited

U.S. PATENT DOCUMENTS 6,801,603 B1 * 10/2004  Arev ................ H04L 51/36
                                                379/88.12
9,450,803 B2 *  9/2016  Kolam ............. H04L 29/08072

(Continued)

OTHER PUBLICATIONS

Ben Baron, "iSub Music Streamer on the App Store on iTunes", [retrieved on May 30, 2014 (May 30, 2014)], Retrieved from the internet: URL:https://itunes.apple.com/in/app/isub-music-streamer/id362920532?mt=8, 3 pages.

*Primary Examiner* — Magdi Elhag
(74) *Attorney, Agent, or Firm* — Cantor Colburn LLP; Richard Wilhelm

(57) ABSTRACT

A mobile device includes a network connection device capable of forming a communication connection to a cellular network and to a wi-fi network and communicating with an application server and an application capable of communicating through the both cellular and wi-fi networks device to a remote device. The mobile device also includes a context module that records and analyzes information about a user's interactions with data provide to the device by the remote device. The context module modifies an API call between the application and the application server based on analysis of prior usage of the application and a current communication connection of the network device.

4 Claims, 3 Drawing Sheets

(58) Field of Classification Search
CPC ... H04W 76/043; H04W 88/06; H04W 24/02; H04W 48/18; H04W 72/1215; H04W 8/18; H04W 28/08
See application file for complete search history.

(56) References Cited

U.S. PATENT DOCUMENTS

| | | | | |
|---|---|---|---|---|
| 2006/0164978 | A1* | 7/2006 | Werner | H04L 41/0896 370/229 |
| 2011/0202905 | A1* | 8/2011 | Mahajan | G06F 8/43 717/140 |
| 2013/0310055 | A1* | 11/2013 | Dewing | H04W 76/025 455/450 |
| 2014/0006538 | A1 | 1/2014 | Oikonomou | |
| 2014/0011538 | A1 | 1/2014 | Mulcahy | |
| 2014/0362712 | A1* | 12/2014 | Agarwal | H04W 28/0236 370/252 |
| 2014/0362713 | A1* | 12/2014 | Agarwal | H04W 24/08 370/252 |
| 2015/0169392 | A1* | 6/2015 | MacKay | H04L 67/02 709/217 |
| 2016/0150006 | A1* | 5/2016 | Sen | H04L 67/1078 709/218 |
| 2016/0191664 | A1* | 6/2016 | Balakrishnan | H04L 67/327 709/203 |

* cited by examiner

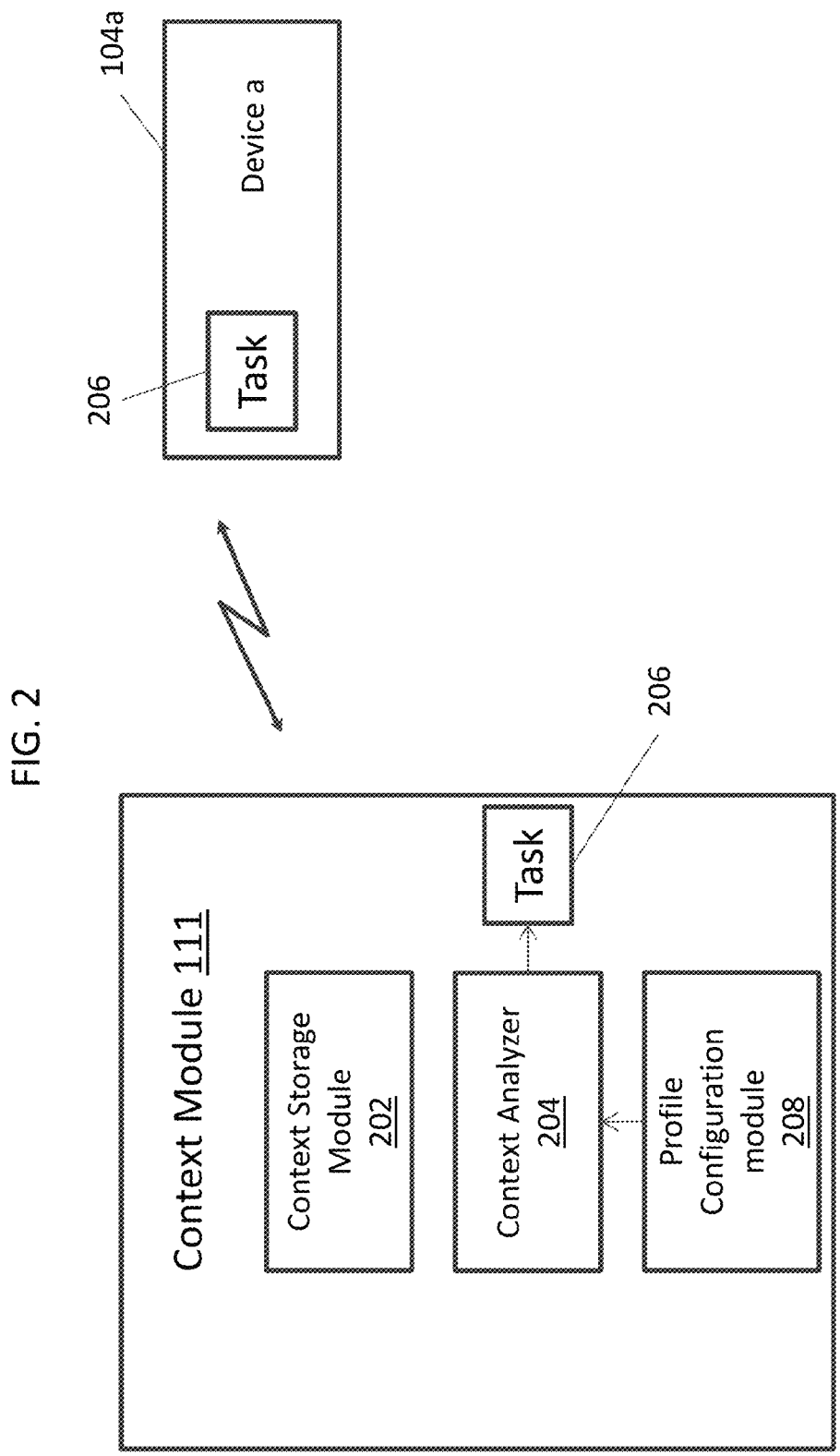

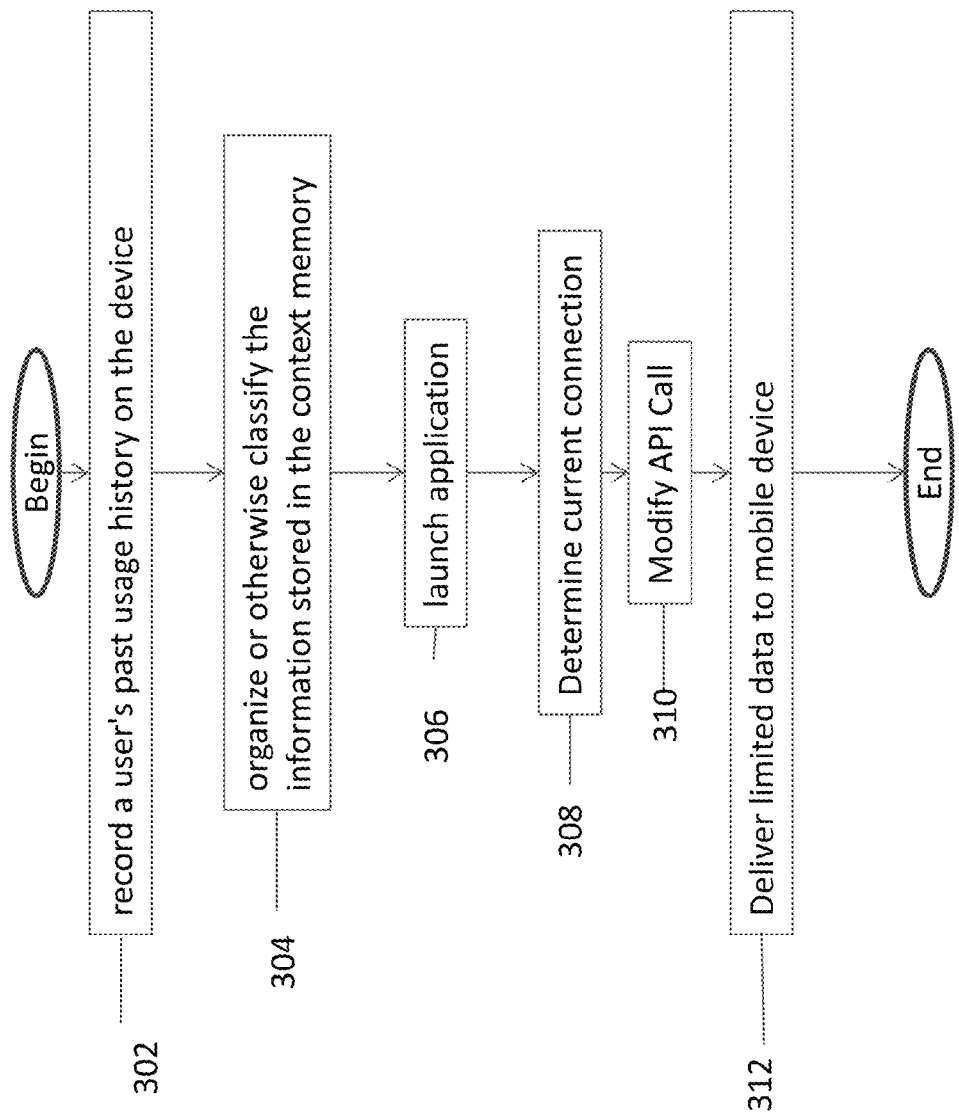

METHOD TO SAVE DATA USAGE IN MOBILE DEVICES BASED ON PRIOR HISTORY

BACKGROUND

The present application relates generally to a data processing apparatus and method and more specifically to systems and methods control the download of information to a mobile device.

The performance of mobile devices has greatly improved over the years. Mobile devices are now capable of storing applications that perform complex computational tasks such as, for example, map and direction generation, image recognition, and image/sound processing, email and text communication that include complex image and the like.

The term "mobile device" refers to any device that may connect to a remote server over a communication network. A communication network may be a cellular or data (e.g., wi-fi) network. Many cell phone providers sell subscription plans that include a limit on the amount the amount of data that may be downloaded to the mobile device over a cellular network over a certain period of time (e.g., per month) but may allow for unlimited downloads when connected to a wi-fi network. In some cases, a cellular phone user may not have sufficient data plan allowances that allow for them to stream or otherwise receive information without exceeding their allotted data for a particular time period. Such limits may cause the user to only download certain items, e.g, large files, or stream certain sources of information (e.g. a conference or web cast) when not connected to a wi-fi network.

SUMMARY

According to an embodiment of the present invention, a mobile device that includes a network connection device capable of forming a communication connection to a cellular network and to a wi-fi network and communicating with an application server and an application capable of communicating through the both cellular and wi-fi networks device to a remote device is disclosed. The mobile device also includes a context module that records and analyzes information about a user's interactions with data provide to the device by the remote device. The context module modifies an API call between the application and the application server based on analysis of prior usage of the application and a current communication connection of the network device.

In another embodiment, a mobile device system is disclosed. The system includes a mobile device including: a network connection device capable of forming a communication connection to a cellular network and to a wi-fi network; an application on the mobile device capable of communicating through the both cellular and wi-fi networks to a remote device; and a context module that records and analyzes information about a user's interactions with data provide to the device by the remote device to produce a summary. The system also includes an application server capable of connecting with the mobile device via the cellular network or the wi-fi network. The server includes a copy of the summary and that modifies information provided to the mobile device based on the summary whether the mobile phone is connected to the server via the wi-fi network or the cellular network.

In another embodiment, disclosed is a method of controlling data usage in a mobile device comprising: recording information in a context module on the mobile phone that records information about a user's use a particular application on the mobile phone; and analyze with a context analyzer the recorded information; determine a current connection method to a communication network; modify an API call from the specified application to a remote server that provides data to the specified application based on the analysis to produce a modified API call; and deliver a limited amount of data to the mobile device based on the modified API call.

BRIEF DESCRIPTION OF THE DRAWINGS

FIG. 2 shows a block diagram of portions of the mobile phone system;
and
FIG. 3 shows a method according to one embodiment.

DETAILED DESCRIPTION

Figure 1:
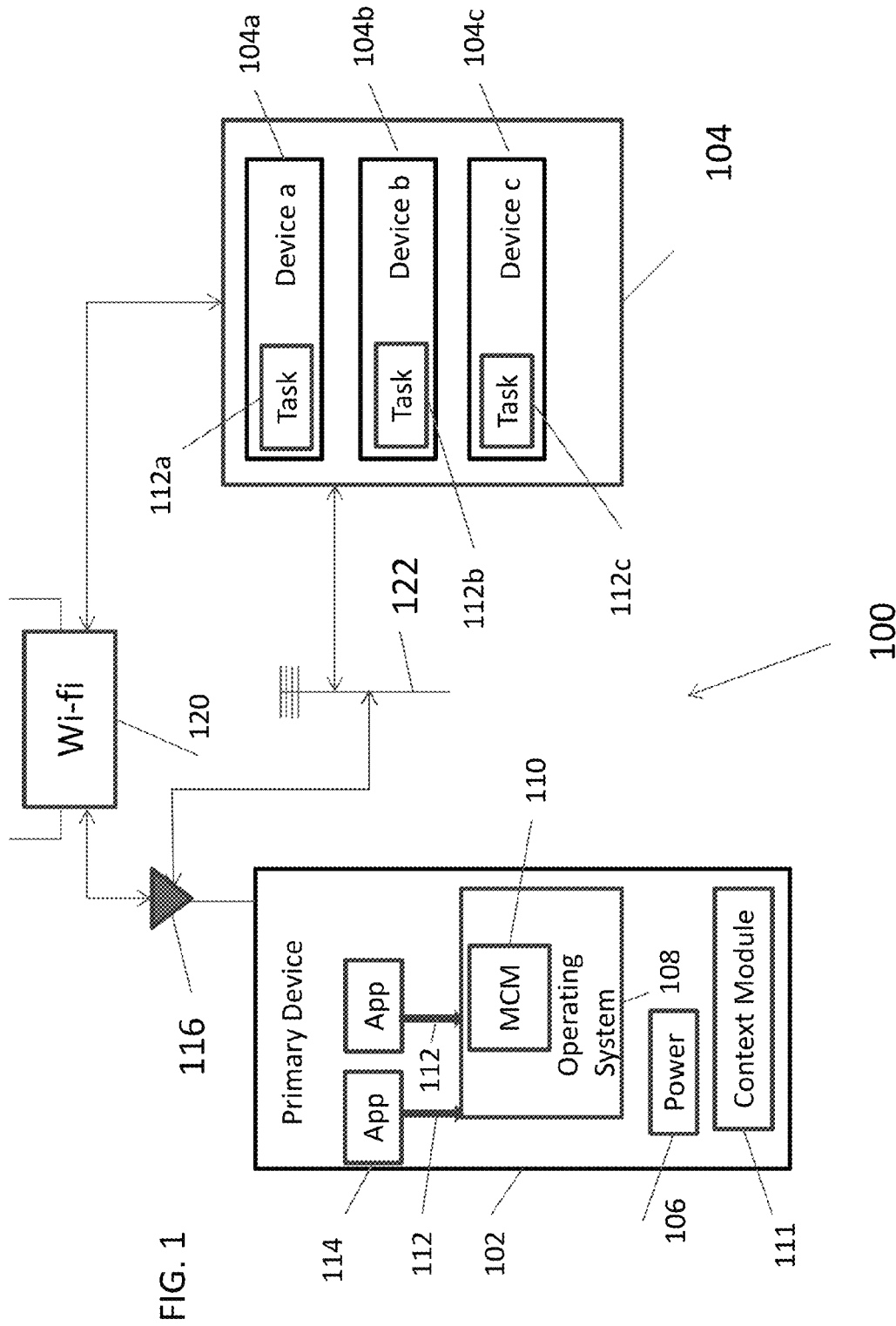
FIG. 1 shows a block diagram of a mobile phone system.

Leveraging free wi-fi data access to download data is favorable for anyone who doesn't have a cellular data plan, has a limited data plan or has limited access to free wi-fi networks. Most applications just download everything or download data based on a set of fixed filter rules preconfigured by the user. As discussed herein, it may be useful to prioritize the material that is being downloaded so that data that is of higher interest is downloaded first, especially when the user has a limited data plan or when the user has very limited access to a free wi-fi network.

Take for example an email program on a cellular phone. Most mobile platforms have configurable options at the application or OS-level to specify what types of networks that application is allowed to use. In such a case, if emails with attachments are not allowed to be downloaded over cellular, when the phone enters a free wi-fi zone, all of the emails with attachments may be downloaded. However, some emails and their attachments may be more important than others. Current systems do not take that into and may not be able to download all emails with attachments in the time provided if the free wi-fi zone is provided, for example, by a coffee shop that the user is only in for 2 minutes. Herein, in one embodiment, more important emails and their attachments may be downloaded before others. The decision whether an email is important may be made dependent on context information drawn from prior usage. For example, work emails from a person (e.g., the user's boss) may always be opened first and have attachments downloaded. This may be determined by, for example, keeping track of emails where not only is the email downloaded, but the attachment is downloaded and opened. Such determinations can be made based on keeping records of prior usage. Such records could monitor one or different metrics.

Consider another example. Some phones have applications that allow them to stream music over the internet. Such applications may be configured to such they are only allowed to cache music data when using a Wi-fi network and stream low quality files when on a cellular network. However, these are static rules that limit an application or OS feature until the setting is again manually changed.

While the two above examples may appear from time to in explaining various embodiments below, it shall be understood that the teachings herein are not limited to those examples. In a general sense, embodiments herein are directed to either a server or device side decision of what data is to be delivered to a mobile device based on current conditions and prior usage of by the user of the mobile device. Collectively, the current conditions and prior usage may be referred to herein as context. The context may be used by the mobile device to send specific data requests a data provided (e.g., a server that serves email, music and the like) or by the server itself to determine what information to push to the mobile device. Regardless of how or where particular decisions are made, one technical effect is that in certain cases more important information is delivered first when a user is in a time limited wi-fi zone. Another technical effect is that when, for example, the mobile device is moving above a certain speed (e.g., in a car), the quality or amount of data provided by a video stream may be reduced so that only sound is broadcast.

Referring now to FIG. 1, a system 100 configured to manage cellular usage of a mobile device when downloading data is illustrated according to an exemplary embodiment. The system 100 includes a primary mobile device 102 and a plurality of peer devices 104. The primary mobile device 102 may include, but is not limited to, a cellular telephone, a laptop computer, a tablet computer, and a mobile media device. The peer devices 104 may include, but are not limited to, a cellular telephone, a personal computer, a laptop computer, a tablet computer, a mobile media device, an internet server, a cloud server microcontroller to control operation of a cloud server, and an automotive microcontroller. The connection between a primary mobile device 102 and a particular peer device 104 may be point-to-point or may be through an intermediate location. For example, the primary mobile device 102 may communicate to a cellular network 122 and then to a peer device 104. For ease of explanation, the cellular network 122 is shown as a single tower but one of ordinary skill will understand that the cellular network is not limited to only a tower and may include other means of transferring information.

The mobile device 102 may, in another case, communicate with a local wi-fi device 120 (e.g., a wireless router) that is communicatively coupled (e.g., via an internet connection) to the peer device 104. Such communication may be conducted via one or more device antennas 116.

The primary mobile device 102 (which may also be referred to simply as a "mobile device" herein) includes a power unit 106, an operating system (OS) 108, and a main communication module 110. The power unit 106 is configured to power the primary mobile device 102. The power unit 106 includes, for example, a rechargeable battery. When the power unit 106 is mains-connected, i.e., connected to a main power source such as a wall-mounted power outlet, the power unit 106 provides a constant and full power to the primary mobile device 102. When the power unit 106 is disconnected from the main power, however, the primary mobile device 102 is powered by a battery included in the power unit 106.

The OS 108 includes a collection of software and hardware components that operate the primary mobile device 102 and perform various computations for locally executing tasks 112 associated with applications 114 stored on memory of the primary mobile device 102 as understood by one of ordinary skill in the art. The tasks 112 may include downloading data. The data download may occur depending on whether the antenna 116 is communicating with the peer or other device 104 via cellular tower 122 or wi-fi device 120.

One of the applications 114 may be an email program and another a streaming music service. Of course, the applications are not limited to these examples and could include a GPS application that determines a location of the mobile device 102 and provides directions or destination suggestions.

The OS 108 may also electrically communicate, i.e., transmit and/or receive data, with the power unit 106 and the main communication module 110. The OS 108 may further utilize the main communication module 110 to electrically receive and/or transmit data such as, for example, one or more tasks 112 associated with a respective applications 114 stored on the primary mobile device 102. The main communication module 110 may include a wireless network module, such as Bluetooth module. The main communication module 110 may also be in electrical communication with a cellular antenna 116. The primary mobile device 102, therefore, may transmit and/or receive data according to a variety of wireless protocols including, but not limited to, Bluetooth, radio frequency (RF), Wi-Fi and cellular wireless standard protocols such as 3G, 4G, Long Term Evolution (LTE), etc.

The other device 104 may each include one or more application servers 104a, 104b, 104c. The application servers 104a-c could be on a single other device on spread over a plurality of different devices (e.g., different servers). That is, the other device 104 may generally include all possible sources of data on the Internet. In one example, the applications 104a-c may be an email server, a music server, an image server, a search engine, an audio/visual server and the like. The information from the application servers 104a-c can be provided by either or both cellular a cellular network 122 or a wi-fi network.

The device 102 may also include a context module 111. The context module 111 may receive and/or record information from any other element or module of the device 102. For instance, the context module 111 can keep a record of email senders from which a particular user more quickly opens messages in their inbox. An example of this may be the case where a user more quickly (after accessing the email program) opens emails received from a particular address (such as the user's employer). The context module 111 can also determine if the mobile device 102 is connected to a wi-fi network 120 or a cellular network 122 and if the mobile device 102 is moving (and possibly its movement rate) by extracting information from an application 114 if such is a GPS application. If shall be understood that the context module 111 may collect and/or analyze some or all of the data usage including when the user is connected via wi-fi, limited wi-fi or cellular.

In one embodiment, some or all of the servers 104 can include an application programming interface (API) 112 that allows for an application 114 to access the server (or particular, program/application thereon). The context module 111, in one embodiment, may vary a typical API call made by an application 114 to, for example, refresh information provided to the application. In that manner, the context module 111 may limit or specify what information is to be delivered when, for example, the user is in a limited wi-fi location or only has cellular contact with the servers 104.

Some further examples are now provided of ways in which the context module 111 may operate is now given with respect to FIGS. 1 and 2. In FIG. 2 the context module 111 may include a context storing module (or memory) 202. The context storing module 111 can be utilized to store any usage information about a particular application. The information can include, for example, time, date, location and type of communication that is used in the interaction and the user's activity. For example, the stored information while using an email application 114 on the device 102 can include any or all of the following:

user deletes an email right away after seeing the sender and subject, without even opening it up;

user opens up the email, but quickly ignore recipients and scrolls through the body of the email and then deletes it;

user opens up the email, reads in detail, and replies or forwards it. Using known algorithms, such information can be analyzed by the context analyzer 204 described below to indicate user is interested in a given email, and can be used in other social application such as Facebook post, tweeter messages, lotus community blog messages, etc.

user did download the picture associated with the email even on cellular data plan.

Of course, different criteria could be recorded as well. The recorded context information may then be analyzed and/or summarized by the context analyzer. This analysis/summary (generally referred to simply as analysis) can occur at certain intervals or continually. The analysis may include analyze the recorded activities, along with data, time and user's network to determine user's behavior and preference. Based on the analysis the context analyzer 204 may produce a summary 206. Thus, summary can provide a brief description of how a particular user interacted with certain classes of data (e.g., did they always open and read email from their workplace and, if present, did they download and/or view attachments to those emails). This summary 206 may be replicated to the application server 104a (or any other application server) in some cases so that some or all of the decisions described below with respect to the device 102 (e.g., context module 111) may be performed, rather, at the application server 104a. For instance, when the device 111 is in cellular only communication, the server 104a may not forward emails that have been prior determined as low interest.

In one embodiment, when the device refreshes data for a given application on limited cellular data network or limited wi-fi access will send an enhanced refresh request via an API that is generated based on the result of the context module and the current location, date time of the user, instead of sending the normal refresh request. For example, when on cellular or limited wi-fi (e.g., the context analyzer may already know that a user is only in contact with a particular wi-fi hot spot for shorts time—the coffee shop example described above), the context module 111 may cause an API to only send emails that qualify is interesting based on the summary 206. Further examples may include an API call POST/applications/email?refresh=true where the POST content is the criteria of the interesting contents (e.g., the summary 206 indicates that certain email contents are usually looked at by the user). The command may include certain topic using OR or AND relationships: examples— {"topic": "urgent|special coupon|north face", "sender": "school teacher if kids are out at school" or "camp is kids out at camp", "etc"} as well as exclude certain topic using OR or AND relationships: examples—["topic": "deal|special offer|promotion"].

In the above description, the context analyzer 204 worked solely on the context information. In another embodiment, the context information may be supplemented with a user defined profile. In one embodiment, the context module 111 may thus include a profile configuration module 208 to allow a user to configure when the device should download the data based on prior user activity first as well as allowing for a particular set of rules to be applied. Examples profile configurations may include: when device is on limited cellular data network, stop downloading after the top data based on prior user activity; context analyzer 204 should consider or should not consider the network type associated with user's activity (for example, similar activity is relevant only when the user is on similar network connectivity); context analyzer module should consider or should not consider location associated with user's activity (for example, similar activity is relevant only when the user is on similar location or types of location); and when device is on free wi-fi, enable device to prioritize the data download based on prior user activity.

Based on the above, it shall be apparent that a method of operating the mobile phone has been disclosed and is further described with respect to FIG. 3. In particular, at block 202 a user's past usage history on the device may be recorded. For example, the interactions with an email program as described above may be recorded in, for example, the context storage module 202.

At block 304 the context analyzer 204 may organize or otherwise classify the information stored in the context storage module 202. This may include, for example, producing summary 206.

At block 306 an application 114 such as an email or music streaming program is launched. At block 308 the current connection method is determined. At block 310, based on the current connection and the summary, an API call to a server may be modified to control data sent to the mobile device. At block 312 the limited data based on the modified API call is provided to the mobile device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile device comprising:
    a network connection device capable of forming a communication connection to a cellular network and to a wi-fi network and communicating with an application server;
    an application capable of communicating through the both cellular and wi-fi networks device to the application server; and
    a context module that records and analyzes information about a user's interactions with data provided to the device by the application server;
    wherein the context module modifies an application programming interface (API) call between the application and the application server based on analysis of prior usage of the application and a current communication connection of the network device;
    wherein the application is an electronic mail (e-mail) application and the application server is formed of at least two email servers, a first personal email server and a second business email server and wherein the API call is modified so only a subset of the user's emails on the servers is provided to the mobile device.

2. The mobile device of claim 1, wherein the context module includes a context analyzer that analyzes the prior usage.

3. The mobile device of claim 2, wherein the context analyzer forms a summary of the prior usage and the context module modifies the API based on the summary.

4. The mobile device of claim 1, wherein the communication connection is a time limited wi-fi connection.

\* \* \* \* \*